(No Model.)
W. J. CARLEY.
CORN FORK.
No. 568,237. Patented Sept. 22, 1896.
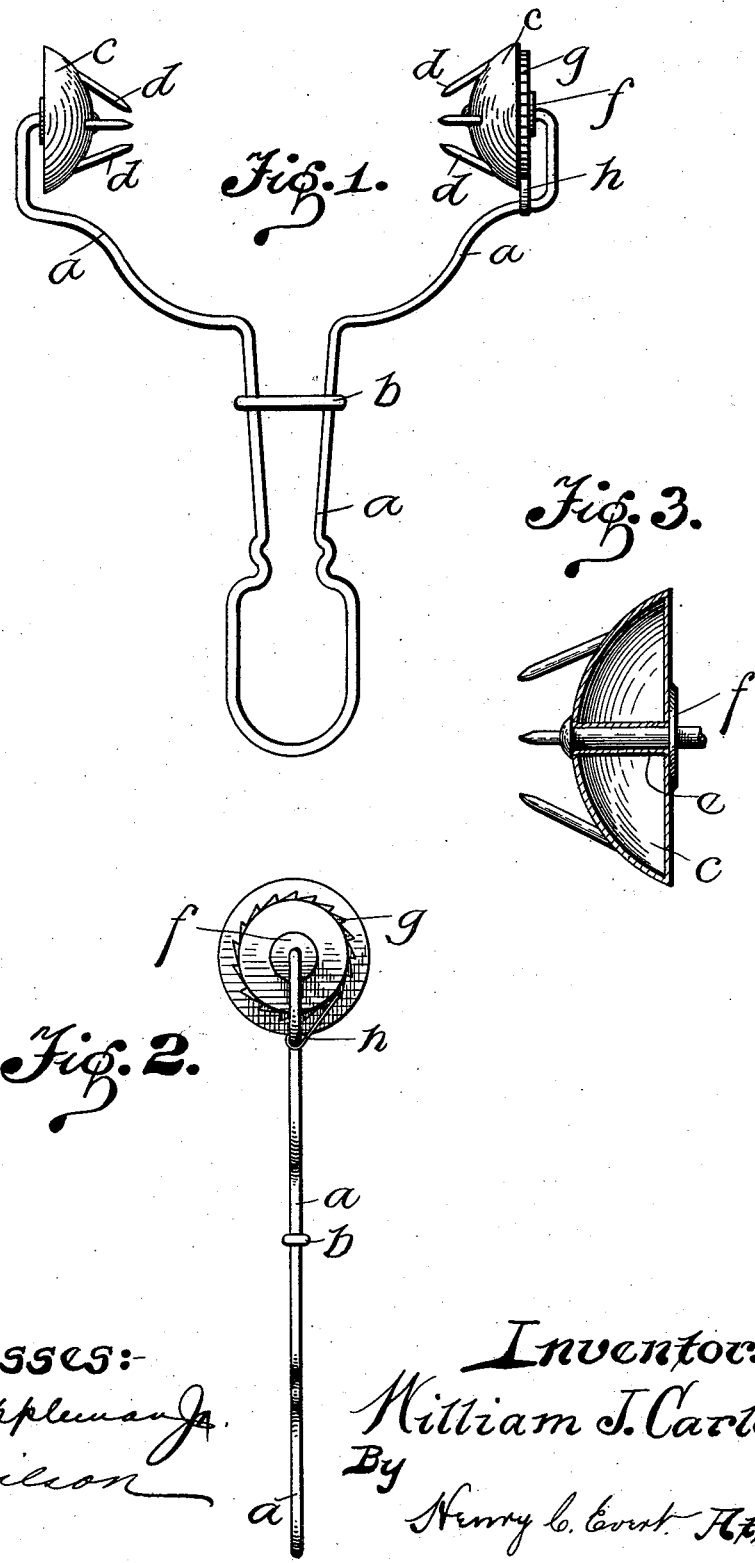

UNITED STATES PATENT OFFICE.

WILLIAM J. CARLEY, OF PITTSBURG, PENNSYLVANIA.

CORN-FORK.

SPECIFICATION forming part of Letters Patent No. 568,237, dated September 22, 1896.

Application filed January 28, 1896. Serial No. 577,181. (No model.)

*To all whom it may concern:*

Be it known that I, WILLIAM J. CARLEY, a citizen of the United States of America, residing at Pittsburg, in the county of Allegheny and State of Pennsylvania, have invented certain new and useful Improvements in Corn-Forks, of which the following is a specification, reference being had therein to the accompanying drawings.

This invention relates to certain new and useful improvements in corn-forks, and has for its object the provision of new and novel means for holding ears of corn while eating without using the fingers.

The invention has for its further object to construct a device of the above-referred-to class whereby when the ear of corn has been placed therein one hand can be used for holding the device while the other is left free to prepare the corn for eating.

A further object of the invention is to construct a corn-holder which will be provided with novel means for turning the ear while eating without soiling the fingers and that will lock and retain the ear in the desired position, preventing the same from turning either backward or forward until manipulated by the party using the same; furthermore, that may be readily adjusted to conform to the various sizes of ears, and that can be easily cleansed after using without any danger of injuring any part of the device.

A still further object of the invention is to construct a corn-fork, as described, that will be extremely simple in its construction, strong, durable, effectual in its operation, handsome in its appearance, and comparatively inexpensive to manufacture.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a front elevation of my improved corn fork or holder. Fig. 2 is a side view of the same, showing the retaining-ratchet. Fig. 3 is a sectional view of one of the ear-supporters.

In the drawings, $a$ represents the frame portion of the holder, which is preferably formed of a piece of wire bent in the shape shown in Fig. 1 of the drawings. On the handle portion of this frame $a$ is provided a link or ring $b$, for the purpose of adjusting the holder, as desired. The upper ends of the wire frame $a$ converge toward each other, forming spindles or axles, which carry semicircular-shaped holders $c$ $c$. These holders are provided with spikes or prongs $d$ $d$, which are adapted to project into the cob and retain the ear in position. The inner ends of the spindles or axles are riveted, so as to retain the holders in position, and to allow the holders to revolve easily and to provide easy manipulation I have provided a barrel $e$ in the center of the holders $c$ $c$, through which the spindles pass, thus forming a journal for the same to operate in. On the spindle or axle is provided a flange $f$, which abuts against the straight side of one of the holders $c$, and the other holder, besides being retained in position with this flange, is provided with a ratchet-wheel $g$, and a pawl $h$, secured to the frame $a$, engages in the teeth of the wheel $g$ and prevents the same from turning backward.

The operation of my improved corn fork or holder will be readily apparent.

The ear of corn is placed between the holders and the spikes or prongs $d$ $d$ engage in the cob and retain the ear in position.

The ear is preferably placed in position with the larger end engaging the holder having the ratchet, as I have constructed the pins or prongs in the opposite end slightly longer, so as to engage in the pointed end of the ear or cob.

When the ear of corn has been placed therein, the holder can be held with one hand and the corn prepared for eating with the other. When the same is ready for eating, it is revolved by turning the holder carrying the ratchet with the fingers, and the ear being rigidly secured to both holders motion will be communicated to the opposite one, so that both will revolve in unison.

By the construction of the semicircular holders c c and the spikes or prongs being provided near and converging toward the center it will be noted that it will give free access to the grains of corn at the ends of the cob, which is of considerable advantage.

The pawl secured to the frame and engaging in the ratchet-wheel prevents the ear from turning backward, and also serves to retain the ear in the position in which it has been placed by the manipulator.

It will be noted that the device can be nickel or silver plated, if desired, to make the same neat and attractive in its appearance, and also that various changes may be made in the details of construction of my improved corn-fork without departing from the general spirit of my invention.

Having fully described my invention, what I claim as new, and desire to secure by Letters Patent, is—

1. In a corn-fork, a suitable handle terminating in axles semispherical holders, provided on their faces with prongs, a ratchet-wheel secured to one of the holders, and a pawl for engaging the ratchet-wheel, as and for the purpose described.

2. In a corn-fork, a handle terminating in axles, semispherical holders rotatable on the axles, prongs on the faces of the holders, a flange at the back of the holder, a ratchet-wheel secured to one of the holders, a pawl engaging therewith, and means for adjusting the fork, as and for the purpose described.

3. In a corn-fork, a suitable handle and frame portion, an adjusting ring or link on the handle portion, the upper ends of the frame forming axles for the reception of semispherical-shaped holders provided with a barrel or hub, and on their inner face with prongs, flanges secured to the axles at the rear of the holders, and a pawl secured to the frame engaging a ratchet-wheel attached to one of the holders, substantially as described and shown.

In testimony whereof I affix my signature in presence of two witnesses.

WILLIAM J. CARLEY.

Witnesses:
ALFRED M. WILSON,
H. E. SEIBERT.